(12) United States Patent
Lee et al.

(10) Patent No.: US 7,619,852 B2
(45) Date of Patent: Nov. 17, 2009

(54) GROUND POST IN DATA STORAGE DEVICE

(75) Inventors: Pei Koh Lee, Singapore (SG);
Natarajan Annamalai, Singapore (SG);
Mo Xu, Singapore (SG); Boon Seng Ong, Singapore (SG); Lai Kein Chang, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 384 days.

(21) Appl. No.: 11/212,305

(22) Filed: Aug. 26, 2005

(65) Prior Publication Data

US 2007/0047136 A1   Mar. 1, 2007

(51) Int. Cl.
*G11B 17/00* (2006.01)
(52) U.S. Cl. .................................................. 360/97.01
(58) Field of Classification Search .............. 360/97.01, 360/264.1, 264.2, 265.2–265.6; 720/650
See application file for complete search history.

(56) References Cited

U.S. PATENT DOCUMENTS

| 5,646,801 | A | * | 7/1997 | Boigenzahn et al. ..... 360/97.01 |
| 5,828,521 | A | * | 10/1998 | Hasegawa ................. 360/266.1 |
| 5,909,338 | A | * | 6/1999 | Butler et al. ............. 360/97.01 |
| 6,230,723 | B1 | | 11/2001 | Kluger |
| 6,353,540 | B1 | * | 3/2002 | Akiba et al. ................ 361/794 |
| 6,385,006 | B1 | * | 5/2002 | Kaczeus et al. .......... 360/97.01 |
| 6,388,834 | B1 | * | 5/2002 | Bernett et al. ............ 360/97.01 |
| 6,560,097 | B2 | * | 5/2003 | Naruo et al. ........... 361/679.38 |
| 6,754,030 | B2 | | 6/2004 | Seng et al. |
| 7,271,978 | B1 | * | 9/2007 | Santini et al. ............ 360/97.01 |
| 2002/0015293 | A1 | * | 2/2002 | Akiba et al. ................ 361/793 |
| 2002/0044515 | A1 | * | 4/2002 | Aizawa et al. ............. 369/75.1 |
| 2002/0054453 | A1 | * | 5/2002 | Alan ....................... 360/97.01 |

* cited by examiner

*Primary Examiner*—Mark Blouin
(74) *Attorney, Agent, or Firm*—Shumaker & Sieffert, P.A.

(57) ABSTRACT

In general, the invention is directed to apparatus that provides one or more low-impedance paths to ground in a data storage device, such as a disc drive, through one or more conductive posts. When a shield, circuit board and base of the data storage device are fastened to one another, the conductive posts are driven into contact with a ground contact on the circuit board or the shield or both.

17 Claims, 2 Drawing Sheets

GROUND POST IN DATA STORAGE DEVICE

TECHNICAL FIELD

The invention relates to electrical circuitry, and more particularly, to electrical circuitry that protects a data storage device such as a disc drive.

BACKGROUND

A data storage device such as a disc drive typically includes a base to which the various drive components are mounted. In the case of a disc drive, the components include a spindle motor, which rotates one or more discs at a constant high speed, and a magneto-resistive read/write head disk assembly (HDA) mounted to an actuator assembly that writes information to or reads information from tracks on the discs. Electronic circuitry, typically in the form of a printed circuit board, regulates the mechanical components and controls the read/write operations. A shield prevents electronic noise generated by the circuitry from leaking into the environment or into the areas occupied by the HDA.

The data storage device typically includes one or more paths to ground that drain away stray charges accumulating on the circuit, the base, or other part of the data storage device. Unless managed, such charges can cause an electrostatic discharge (ESD), which an uncontrolled and undesirable flow of current. An ESD can interfere with, damage, degrade or destroy the electronic circuitry. An ESD can also interfere with the operation of an HDA. A ground path helps drain away stray charges, reducing the risk that an ESD will occur. In some data storage devices, one or more metal screws provide a conductive path to ground, and also fasten components such as the base, shield and circuit board to one another. As a general proposition, it is more desirable to have more paths to ground than fewer paths, but providing each new path with a screw takes up additional space on the base, shield, circuit board or a combination thereof.

SUMMARY

In general, the invention is directed to apparatus that provides one or more low-impedance paths to ground while saving hardware and maintaining space-savings for the data storage device. Although the invention is not limited to application with any particular data storage device, the invention will be described in the context of a disc drive.

In one embodiment of the invention, paths to ground are provided by one or more conductive posts that are forced into contact with a ground contact on a circuit board or a shield or both. The conductive posts provide one or more paths to ground. The paths to ground provided by the conductive posts can be in addition to paths to ground through fastening screws, or can supplant paths to ground through fastening screws.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
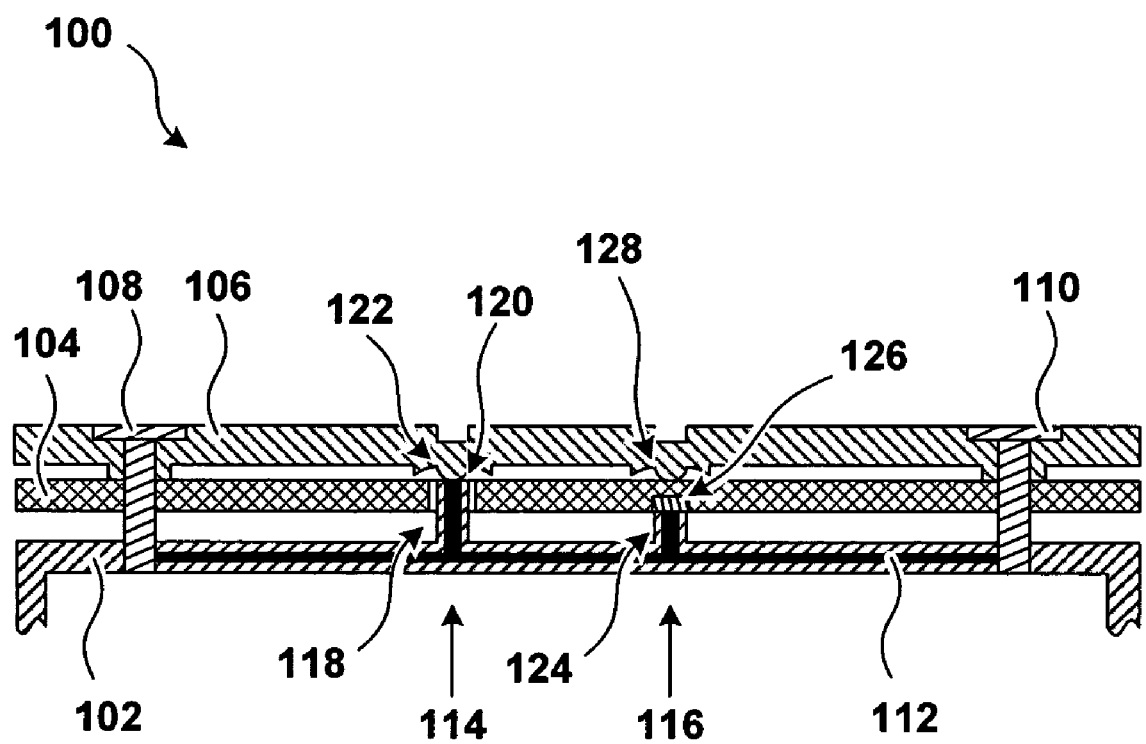
FIG. 1 is a cross-sectional diagram illustrating paths to ground in a disc drive according to an embodiment of the invention.

FIG. 1 is a cross-sectional diagram illustrating exemplary low-impedance paths to ground for an exemplary data storage device 100. In the example of FIG. 1, data storage device 100 is a disc drive. FIG. 1 shows selected components of disc drive 100, particularly base 102, printed circuit board 104 and shield 106. Base 102 is the component to which the various drive components (not shown) are mounted. Printed circuit board 104 includes the circuitry that regulates the mechanical components and controls the read/write operations of the disc drive. Shield 106 prevents electronic noise generated by printed circuit board 104 from leaking into the environment and also helps manage electromagnetic interference.

Base 102, printed circuit board 104 and shield 106 are affixed to one another with screws 108 and 110. It is assumed that screws 108 and 110 provide a path to ground for stray currents. As shown in FIG. 1, base 102 includes a ground node 112, i.e., a conductor that is electrically coupled to ground. Ground node 112 is depicted in FIG. 1 as being in contact with screws 108 and 110. Shield 106 may be constructed from a conductive material or may include one or more conductors that electrically couple to screws 108 or 110, or that are deployed at various locations on shield 106. These conductors on shield 106 are conductors for draining stray charge and directing it to ground node 112.

In the exemplary embodiment shown in FIG. 1, two conductive posts 114 and 116 extend from base 102 in the direction of printed circuit board 104 and shield 106. First conductive post 114 extends thorough a hole 118 in printed circuit board 104. A post contact point 120 is in physical contact with a contact point 122 on shield 106, thereby electrically coupling shield contact point 122 with ground node 112. In addition to a conductor, shield contact point 122 may include a forcing device such as a spring that drives shield contact point 122 against post contact point 120. A forcing device enables shield contact point 122 to remain electrically coupled to post contact point 120 when disc drive 100 is subjected to physical disturbance.

Contact point 124 of second conductive post 116 is in physical contact with a ground electrode 126 on printed circuit board 104. Ground electrode 126 represents the ground node of printed circuit board 104. A forcing device 128 such as a spring drives ground electrode 126 of printed circuit board 104 against contact point 124, which enables circuit board ground electrode 126 to remain electrically coupled to post contact point 124 when disc drive 100 is subjected to physical disturbance.

In the embodiment depicted in FIG. 1, contact point 120 of conductive post 114 is electrically coupled to shield 106 but not to printed circuit board 104, and conductive post 116 is electrically coupled to printed circuit board 104 but not to shield 106. The invention also supports embodiments in which a conductive post is electrically coupled both to printed circuit board 104 and to shield 106. In other words, the invention supports embodiments in which a conductive post is in physical contact with a contact point on shield 106 and is also in physical contact with ground electrode 126.

Conductive posts may be made from any conducting material, and can be formed by molding or any other known technique. Contact points likewise may be any known conductor. As mentioned above, forcing devices can be springs or other structures that help maintain electrical contact. In one implementation, a forcing device on shield 122 is an embossed spring contact, which can serve as both an electrical contact point on the shield and as a forcing device that drives its contact point into physical contact with the conductive post.

As depicted in FIG. 1, conductive posts 114 and 116 are non-fastening structures. Unlike screws 108 and 110, which fasten base 102, circuit board 104 and shield 106 together, conductive posts 114 and 116 do not mechanically fasten or secure base 102, circuit board 104 and shield 106 to one another. With conductive posts deployed as illustrated in FIG. 1, however, fastening structures such as screws 108 and 110 can be constructed of nonconductive material, as screws 108 and 110 need not provide paths to ground.

Shield 106 can be constructed from a conductive material or a non-conductive material that includes one or more conductive elements. Shield 106 provides paths for stray charges to go to ground. In some disc drives, the conductive elements of shield 106 may be electrically coupled to the screws. Each screw, however, has associated costs in terms of economics and space, and there is therefore incentive to reduce the number of screws in the drive. If there are few screws, there are few available paths to ground. When there are fewer paths to ground, the conductive elements carry greater amounts of current, and therefore currents flowing in the conductive elements generate electromagnetic fields of greater magnitudes.

The invention provides the opportunity to create paths to ground in addition to, or other than, the paths provided by the screws. The effect is to create more paths for stray charges to go to ground. When there are more paths to ground, individual conductive paths carry smaller amounts of current, resulting in the generation of smaller electromagnetic fields and consequently less electromagnetic interference.

Furthermore, the circuitry may benefit from having more paths to ground. A printed circuit board need not have its ground node electrically coupled to screws, but can couple its ground node to ground by multiple paths. Multiple paths to ground also provide redundant grounding in the event one path to ground is interrupted.

Base 102 may be formed from any material, including metal. A base can be formed from aluminum, for example, and can be formed using aluminum casting techniques. Although depicted in FIG. 1 as having a particular ground node 112, a metal body of base 102 can serve as a large node at ground potential. In other embodiments, base 102 can be formed from one or more durable conductive and non-conductive materials, with the conductive materials being at ground potential.

When base 102 is cast from a metal such as aluminum, conductive posts may be integrated into base 102 at any desired locations during the casting process. The invention also supports embodiments, however, in which one or more conductive posts are affixed to the base after the base has been formed. Conductive posts may have any desired shape or dimensions.

Figure 2:
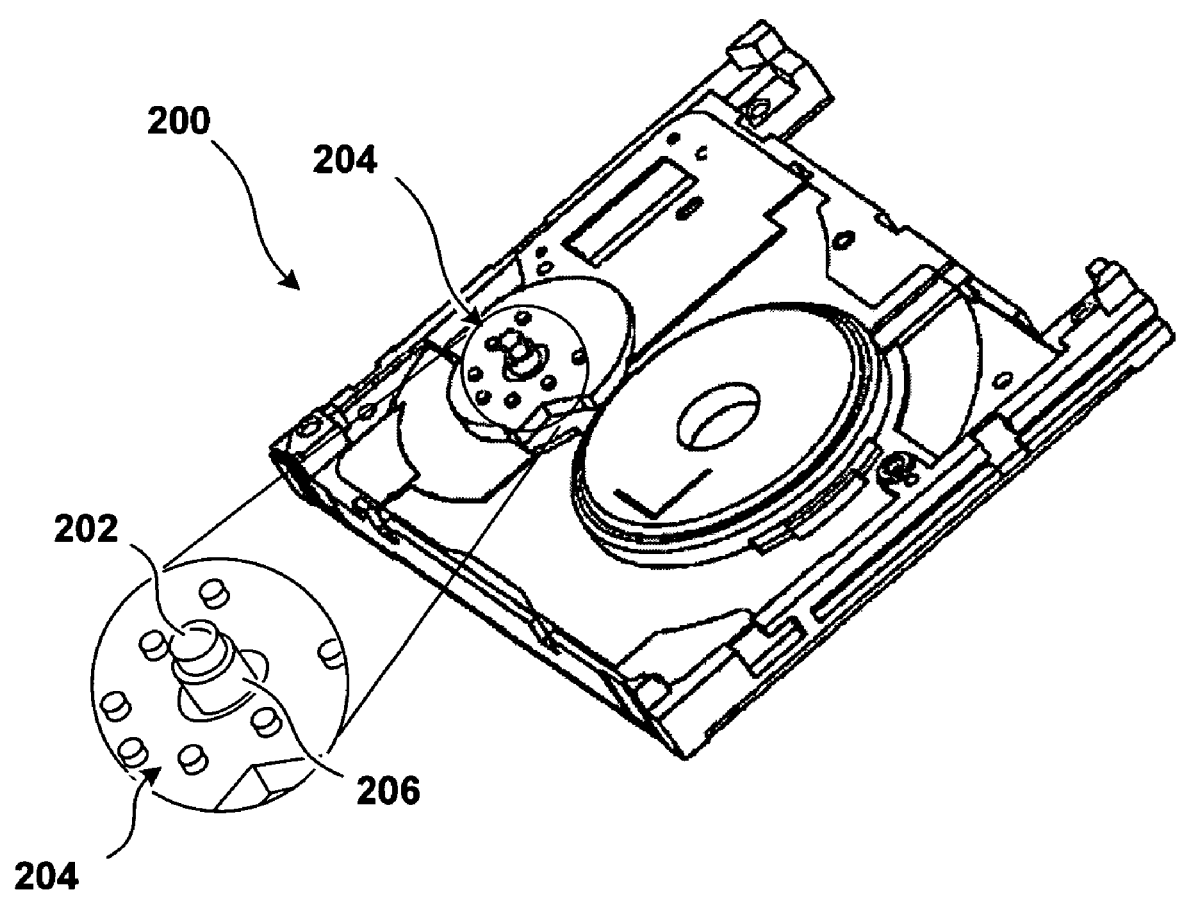
FIG. 2 is a perspective view of an exemplary disc drive base illustrating a possible deployment of a conductive post according to the invention.

FIG. 2 illustrates an example of a base 200 of a data storage device such as a disc drive. Base 200 includes a conductive post 202. Base 200 includes a mounting 204 upon which an actuator assembly with read/write head (not shown) is to be mounted. Mounting 204 includes a bearing shaft 206, upon which the actuator assembly pivots. Conductive post 202 projects from bearing shaft 206. FIG. 2, in other words, depicts a conductive post atop a raised structure, i.e., bearing shaft 206 of mounting 204. When base 200 is assembled in a disc drive, conductive post 202 can be in electrical contact with a circuit board (not shown) or a shield (not shown) or both. Furthermore, conductive post 202 is deployed so as not to interfere with the operation of the various drive components that will be mounted to base 200. Other conductive posts (not shown in FIG. 2) may project from elsewhere on base 200.

The invention supports considerable flexibility in data storage device design and manufacture. Conductive posts can be deployed at any convenient locations and in any number desired, and forcing devices may be deployed on the shield to maintain electrical contact between components and the conductive posts. Although a fusing element such as solder can be used to electrically couple a conductive post to another contact, forcing devices may make such fusing unnecessary. In addition to the potential advantages discussed previously, the invention conforms to known assembly techniques, in that the same techniques used to assemble a disc drive can also be used to assemble a disc drive having one or more conductive posts according to the invention.

A number of embodiments of the present invention have been described. Nevertheless, it will be understood that various modifications may be made without departing from the spirit and scope of the invention. For example, conductive posts need not be straight, need not project perpendicularly from a base, and need not be substantially cylindrical. Accordingly, other embodiments are within the scope of the following claims.

The invention claimed is:

1. A data storage device comprising:
   a circuit board including a first ground node, wherein the circuit board forms a hole;
   a shield comprising a contact point; and
   a base fastened to the circuit board and the shield, with the circuit board interposed between the shield and the base, the base comprising a second ground node, a first conductive post extending from the base in the direction of the circuit board and a second conductive post extending from the base in the direction of the circuit board and through the hole in the circuit board,
   wherein the first ground node is placed in electrical contact with the second ground node via the first conductive post,
   wherein the contact point of the shield is placed in electrical contact with the second ground node via the second conductive post,
   wherein the first and second conductive posts are non-fastening structures, and
   wherein the second conductive post is not in physical contact with the circuit board.

2. The data storage device of claim 1, wherein the shield comprises a forcing device that drives the second ground node into physical contact with the first conductive post.

3. The data storage device of claim 1, wherein the shield comprises a forcing device that drives the contact point into physical contact with the second conductive post.

4. The data storage device of claim 1, wherein the data storage device is a disc drive.

5. A data storage device comprising:
   a circuit board;
   a shield comprising a contact point; and
   a base fastened to the circuit board and the shield, with the circuit board interposed between the shield and the base, the base comprising a ground node and a conductive post extending from the base in the direction of the shield, wherein the base, including the conductive post, is a unitary component,
   wherein the contact point is placed in electrical contact with the ground node via the conductive post, and
   wherein the conductive post is a non-fastening structure.

6. The data storage device of claim 5, further comprising a forcing device that drives the contact point into physical contact with the conductive post.

7. The data storage device of claim 6, wherein the forcing device is a spring.

8. The data storage device of claim 5, wherein the data storage device is a disc drive.

9. A disc drive comprising:
a circuit board including a first ground node, wherein the circuit board forms a hole;
a shield comprising a contact point;
a base fastened to the circuit board and the shield, with the circuit board interposed between the shield and the base, the base comprising a second ground node, a first conductive post extending from the base in the direction of the circuit board and a second conductive post extending from the base in the direction of the circuit board and through the hole in the circuit board,
wherein the first ground node is placed in electrical contact with the second ground node via the first conductive post,
wherein the contact point of the shield is placed in electrical contact with the second ground node via the second conductive post,
wherein the first and second conductive posts are non-fastening structures, and
wherein the second conductive post is not in physical contact with the circuit board;
a bearing shaft protruding from the base; and
an actuator assembly mounted on the bearing shaft,
wherein the first conductive post projects from the bearing shaft in the direction of the circuit board.

10. The disc drive of claim 9, wherein the shield comprises a forcing device that drives the second ground node into physical contact with the first conductive post.

11. The disc drive of claim 9, wherein the shield comprises a forcing device that drives the contact point into physical contact with the second conductive post.

12. A disc drive comprising:
a circuit board;
a shield comprising a contact point;
a base fastened to the circuit board and the shield, with the circuit board interposed between the shield and the base, the base comprising a ground node and a conductive post extending from the base in the direction of the shield, wherein the base, including the conductive post, is a unitary component,
wherein the contact point is placed in electrical contact with the ground node via the conductive post, and
wherein the conductive post is a non-fastening structure;
a bearing shaft protruding from the base; and
an actuator assembly mounted on the bearing shaft,
wherein the second conductive post projects from the bearing shaft in the direction of the shield.

13. The disc drive of claim 12, further comprising a forcing device that drives the contact point into physical contact with the conductive post.

14. The disc drive of claim 13, wherein the forcing device is a spring.

15. A data storage device comprising:
a circuit board forming a hole;
a shield comprising a contact point; and
a base fastened to the circuit board and the shield, with the circuit board interposed between the shield and the base, the base comprising a ground node and a conductive post extending from the base in the direction of the shield and extending through the hole in the circuit board,
wherein the conductive post is a non-fastening structure,
wherein the contact point is placed in electrical contact with the ground node via the conductive post, and
wherein the conductive post is not in physical contact with the circuit board.

16. The data storage device of claim 15, further comprising a forcing device wherein the contact point is placed in electrical contact with the ground node via the forcing device.

17. The data storage device of claim 15,
wherein the conductive post is a first conductive post,
wherein the base further includes a second conductive post,
wherein the second conductive post is a non-fastening structure, and
wherein the circuit board is placed in electrical contact with the ground node via the second conductive post.

* * * * *